United States Patent [19]

Fiori et al.

[11] 4,001,882
[45] Jan. 4, 1977

[54] MAGNETIC TAPE EDITING, PREVIEWING AND ANIMATING METHOD AND SYSTEM

[75] Inventors: Anthony M. Fiori, Schwenksville; Robert T. Fiori, Lansdale; Thomas C. Nicholas, III, Schwenksville, all of Pa.

[73] Assignee: Spectra-Vision Corporation, Philadelphia, Pa.

[22] Filed: Mar. 12, 1975

[21] Appl. No.: 556,141

[52] U.S. Cl. .................................. 360/14; 360/72; 360/74; 360/91

[51] Int. Cl.² .................. G11B 27/08; G11B 27/14; H04N 5/78

[58] Field of Search ................. 360/13, 14, 71, 72, 360/73, 74, 84, 90, 91

[56] References Cited

UNITED STATES PATENTS

| | | | |
|---|---|---|---|
| 3,230,307 | 1/1966 | Bounsall | 360/14 |
| 3,364,306 | 1/1968 | Brown | 360/14 |
| 3,463,877 | 8/1969 | Crum | 360/14 |
| 3,646,260 | 2/1972 | Bolger | 360/14 |
| 3,647,951 | 3/1972 | Rose, Jr. | 360/14 |
| 3,655,910 | 4/1972 | Wada et al. | 360/14 |
| 3,787,617 | 1/1974 | Fiori | 360/14 |

*Primary Examiner*—Raymond F. Cardillo, Jr.
*Attorney, Agent, or Firm*—Dorfman, Herrell and Skillman

[57] ABSTRACT

In editing magnetic tape, in particular video tape, improvement in the editing taught by U.S. Pat. No. 3,787,617 is achieved by arresting the respective tapes on the edit tape deck and the source tape deck precisely at the "edit" point by observation on a monitor. The deck motors are started in reverse and the tape-feed rollers are allowed to achieve full speed; the two tapes are then engaged with the reversely-moving rollers and are driven in reverse for a precise period to establish a "pre-edit" start point. When edit is to begin, the drive motors of the respective tape decks are started to drive forward; after the rollers are up to full speed the feed rollers are engaged with the tape to drive the same forward for the precise time period corresponding to the time period of reverse drive; and thereupon the system operates to either edit at the edit point or to preview a proposed edit at the edit point.

22 Claims, 3 Drawing Figures

MAGNETIC TAPE EDITING, PREVIEWING AND ANIMATING METHOD AND SYSTEM

This invention relates to a method or process for editing magnetic tape and a system for accomplishing such editing. The tape involved can be video, audio, instrumentation, or data tape and the system can be recorders and players for any such tapes. It is also possible to edit onto video tape from movie film or directly from a camera using known techniques for the transfer within the scope of the invention.

BACKGROUND OF THE INVENTION

Magnetic tapes, unlike movie film cannot be suitably edited by cutting and splicing. As a practical matter, magnetic tapes of all types are edited by making a new edited tape from one or more source tapes on which the original recording has been done. Considering a typical video tape problem, in producing a television drama, for example, it may be more convenient to record scenes out of order of the sequence in which they will appear on television. For example, if scenes 2 and 5 are taken in one setting it may be of advantage to take scene 2 and then immediately take scene 5, later recording, out of sequence, scenes 3 and 4. When this is done, the editing process will interpose scenes 3 and 4 between scenes 2 and 5. Editing requires knowing or being able to determine precisely where one scene ends and the next scene begins on the tape. In making the edited tape, for example, after transferring scene 2 to the edited tape, the edit tape deck is stopped precisely at the end of scene 2. This can be done by visually observing the picture produced on the monitor from the source tape at the time it is being edited and transferred to the edited tape. Then while the edit tape deck is stopped, the source tape used in taking the scenes must be rolled ahead to the point where scene 3 begins. When scene 3 is found, it is not possible to simply start up the edit tape deck and start recording. In order to get a proper recording a tape deck must be up to speed before recording starts. This requires back-spacing both the edit and source tapes before recording to allow each tape to accelerate to recording speed so that recording can begin the proper place.

As a practical matter, in the prior art, editing was done as a matter of guess work with the editor making his best judgement about how far to backup each tape deck and then trying to synchronize the source and edit tape decks so that the edit points occur at the same time. Editors have had to guess and either took long periods on the average or produced edited products of variable quality. Others have used various aids such as measuring the tape and marking a starting place physically with markers, or ink, but this is tedious, time consuming and subject to error.

RELATED PRIOR PATENT

In the earlier U.S. Pat. No. 3,787,617, the editing method and system embodies a compensation for the differing dynamic characteristics of the various tape decks in order to provide a method and system in which the transfer of data at the edit point is effected properly. The embodiment of the invention disclosed in this patent includes the use of an adjustable timer in each tape deck and the operation of the system provides for adjustment of the timer to perform the desired compensation for the differing dynamic characteristics of the tape deck. The adjustment of the timer is performed empirically. The skill of the operator in setting the adjustments of the timer is critical, but once the timer has been set the system operates satisfactorily until the conditions change so as to require a re-setting of the timers.

THE PRESENT INVENTION

The present invention provides an improvement in the compensation for the differing dynamic characteristics of the various tape decks by disengaging the drive roll from the tape or other data web in the deck during the period when the drive rolls are subjected to a change in the driving function which brings into operation the different dynamic characteristics of the tape decks. In accordance with the present invention, the tapes are brought into engagement with the drive rolls at a time when the rolls are operating at full speed either in reverse or in forward, and in this fashion it is possible to obtain an accurate metering of the travel of the tapes simply by an accurate measurement of the time in which the tapes are engaged with the rolls.

In accordance with the present invention, the system compensates for differing dynamic characteristics not only in startup and reversing of the drive to the rolls, but also in the running characteristics of the rolls. The system compensates for slight differences in the running characteristics of the rolls by reason of the particular operation in which the starting point for the metering function is selected to be precisely at the edit point. The metering function is initiated by the movement past the edit point, either in the reverse or in the forward direction, and the times operation of the engagement of the rolls with the tape for a predetermined period away from the edit point is matched with an equally precise, timed operation from the stopping point back to the edit point. In this fashion, any slight variation in linear operating speed of the roll will affect the reverse travel to the same degree in which it affects the forward travel and such slight difference is therefore compensated for without complicated adjustments. Thus, the several tape decks may be snychronized at the edit point regardless of slight variations between the linear speeds of the deck drive rolls and this is effected with the use of a common timing control for the several decks.

The system of the present invention is particularly adapted to provide, in addition to the normal edit mode of operation described in the above-identified U.S. Pat. No. 3,787,617, a preview mode of operation in which the system operates to display on the monitor the result which will be obtained by the editing before the editing actually occurs, the system automatically retaining or storing the selected edit points to thereby perform the edit precisely in the manner displayed in the preview mode.

In accordance with this feature of the present invention, after selection of the edit point on the two tapes, each tape is rolled back with the aforesaid accurate metering to a pre-edit start point. The accurate metering is again employed to return the tapes to the edit point and a further accurate metering is employed to advance the tapes to a post-edit stop point. In the preview mode, the same accurate metering of the tape travel returns both tapes to the pre-edit start point automatically at the completion of the preview to thereby condition the system for editing if the preview indicates a satisfactory selection of edit points.

The present invention also provides a simple and effective system for providing animation. In the animation mode, the system of the present invention utilizes the accurate metering of the tape travel between the pre-edit start point and the post-edit stop point of the preview mode in conjunction with a delay circuit which automatically advances the edit point a single frame or a selected number of frames, as determined by the delay, to record an individual scene. By repeated operation in the animation mode, a sequence of individual scenes may be recorded on the edit tape following the edit point.

DETAILED DESCRIPTION OF THE INVENTION

The preferred embodiment of the present invention is described more fully hereinafter, reference being made to the accompanying drawings, in which.

In the normal operation of an editing system, the edited tape is prepared on an edit tape deck from a master source, for example a video tape and the system operates to perform the transfer from the source to the edit tape continuously until it is desired to interrupt the information supplied from the master source at an edit point. At the edit point, the material from another source, or from another portion of the same source, is transferred to the edit tape and the transfer operates to record the information from the second source on the edit tape. The editing system then proceeds to record on the edit tape the material from the edit point of the second source until the complete information from the second source is recorded. The completion of the recording of the information from the second source marks a further edit point. and the editing system then may revert to recording information from the first source or may record information from a third source, as desired and as selected by a selecting mechanism.

To perform proper editing without distorting the signals recorded on the edit tape, it is important that all of the sources and the edit tape deck be operated at full speed to insure the generation of the proper signal for transfer to the edit tape and for recording on the edit tape. Thus, a proper merger of the information from two tape sources may not be effectively accomplished if either of the tapes is arrested at the edit point when the transfer is accomplished; but the tapes must be "on the run". To effect the transfer, the edit tape is backed off from the edit point and the second source tape is backed off from its edit. The two tapes are then advanced so that they are at full speed and so that their edit points coincide to initiate recording from the edit point of the second source tape at the instant the edit tape reaches its edit point.

Figure 1:
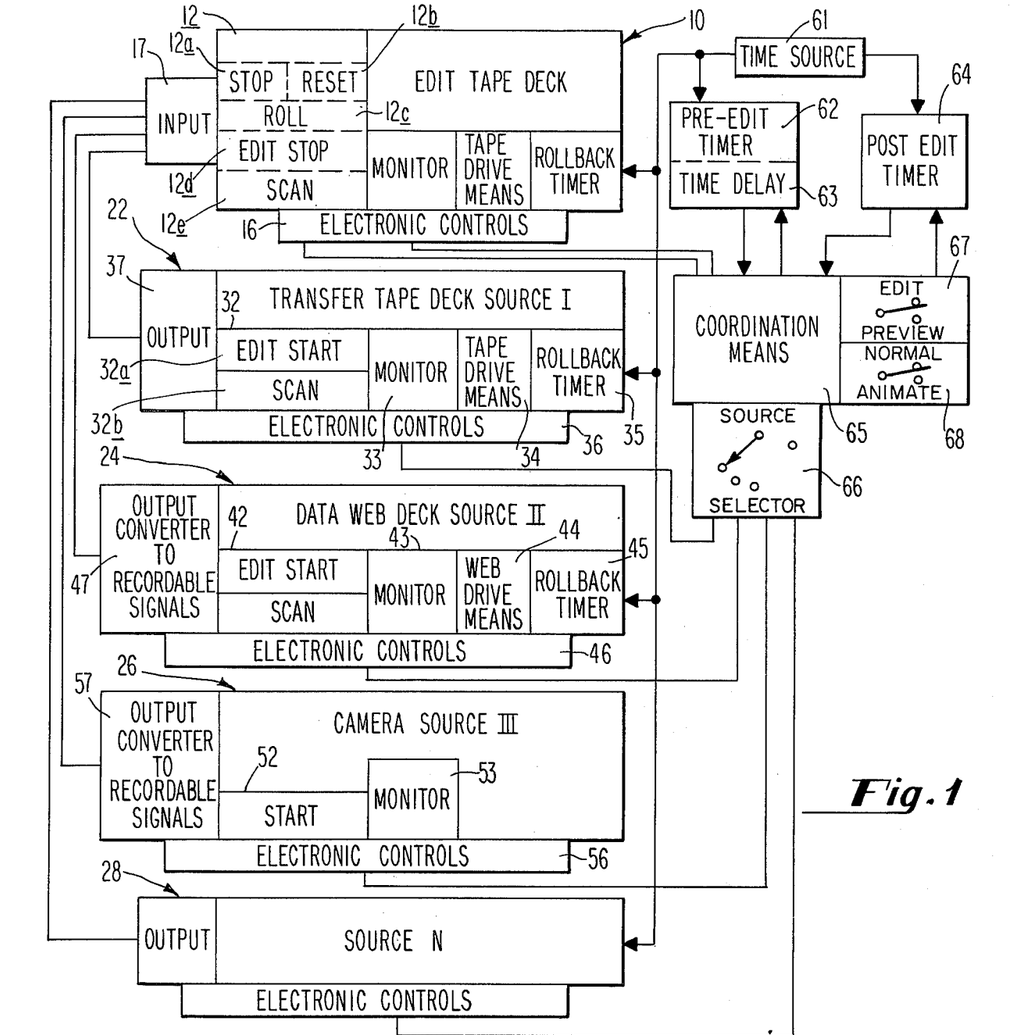
FIG. 1 is a schematic block diagram of an editing system embodying the present invention.

With reference to the drawings, FIG. 1 shows schematically the configuration of a system in accordance with the present invention which has components which permit the principal edit functions to be performed. It should be understood that the invention does not require the inclusion of all of the components illustrated schematically in FIG. 1, but a proper editing function may be accomplished with a single edit deck in combination with one other source such as a transfer tape deck, a data web deck or the like. The invention is particularly applicable to editing video tape, but other magnetic tapes may be edited in accordance with the present invention. In FIG. 1, the edit tape deck is shown schematically at 10 and the deck includes a series of manual controls as described more fully hereinafter and indicated at 12, a monitor at 13, a tape drive means at 14 and a rollback timer 15. The deck 10 is responsive to control signals through electronic controls at 16 and receives information in the form of magnetic input signals as indicated at 17. The tape deck functions conventionally to record the signals which are fed through the input 17 onto the edit tape which is advanced through the deck by the tape drive means 14.

The information signals fed to the input 17 come from one or more of a plurality of separate sources. In FIG. 1, separate sources are shown diagrammatically at 22, 24, 26 and 28. Source I, as shown at 22, comprises a conventional magnetic tape deck such as a video tape deck and includes manual controls 32, a monitor 33, tape drive means 34 and a rollback timer 35. In addition, the deck includes electronic controls 36 and an output stage at 37. Operation of the transfer deck 22 generates a signal which may be transferred from the output 37 of the deck 22 to the input 17 of the deck 10.

A second signal source "Source II" is shown diagrammatically at 24 and comprises a data web deck which generates tape-recordable signals from movie film, punched paper tape, or other data webs. The source 24 includes manual controls 42, a monitor 43, web drive means 44 and a rollback timer 45. The deck 24 is responsive to electronic control signals through electronic controls 46 and operates to put out a tape-recordable signal through an output stage 47 which includes a converter to convert the information on the data web to signals suitable for recording on the edit tape.

A third source "Source III" is shown schematically at 26 and this source comprises a television camera. The camera has manual controls 52, a monitor 53, electronic controls 56 and an output stage 57 which cause the video signals to be recorded on the edit tape.

FIG. 1 also illustrates a further source "Source N" at 28 which generates tape-recordable signals, and which may be identical to any one of the sources discussed above. Alternatively, the source may consist of a audio recorder which records an audio signal and converts it to a tape-recordable signal in the output stage thereof.

Although the foregoing description has been directed to a video tape system in which the information incorporated in the edited tape consists of tape-recordable signals reflecting audio and video intelligence, the present invention is not limited to this form of intelligence but other forms of information may be recorded on the edited magnetic tape.

In addition to the edit tape deck 10 and the multiple sources, FIG. 1 also includes additional components of the system including a time source 61, a pre-edit timer 62 having an "animate" time delay section 63, a post edit timer 64 and source coordination means 65 including a source selector 66, an Edit/Preview selector 67 and a Normal/Animate selector 68 whose purposes will be discussed more fully hereinafter.

Figure 2:
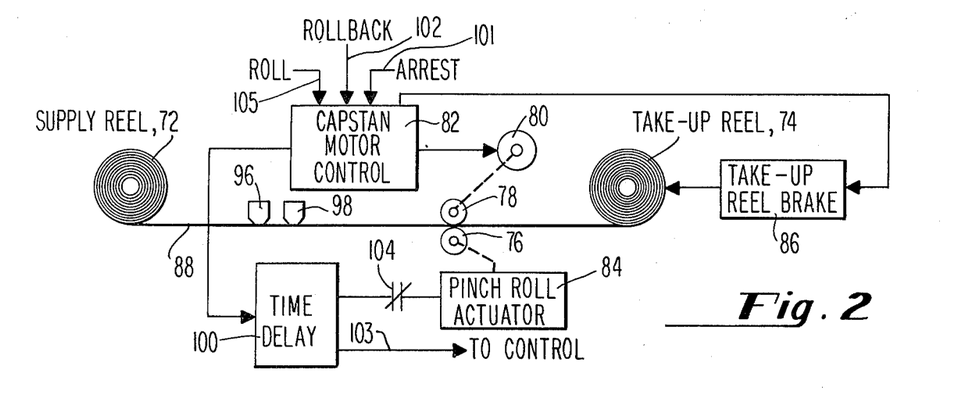
FIG. 2 is a schematic illustration of some of the mechanical parts of one form of tape deck which may be involved in the system of the present invention, other parts not being shown.

FIG. 2 is a schematic illustration showing a typical tape drive means for the tape decks as indicated in FIG. 1 at 14 and 34 and similar controls may be also applied to the web drive means 44. As shown in FIG. 2, the tape 88 is fed along a tape path between a supply reel 72 and a takeup reel 74, in the course of which it passes a plurality of heads including a recording head 96 and a playback head 98. The tape is driven by a drive capstan 78 in cooperation with a pinch roll 76. The capstan 78 is driven by a motor 80 under the control of a capstan motor control 82. The pinch roller 76 effects engagement and disengagement of the tape with the drive capstan 78 by means of a pinch roll actuator mechanism 84. A brake 86 is provided on one of the reels, in the present instance the takeup reel 74.

In accordance with the invention, the tape drive operates to disengage the tape from its drive capstan during reversing and starting up of the capstan motor, so that the differing dynamic characteristics of the different capstan motors which manifest themselves during reversing and starting-up do not affect the precise timing of the tape drive. To this end, a time delay 100 is provided between the motor control 82 and the pinch roll actuator 84. As shown, an arrest signal may be fed to the motor control 82 as indicated at 101 to stop the motor 80 and actuate the brake 86 thereby immediately stopping the tape. The arrest signal through the time delay 100 also disengages the pinch roll. A rollback signal introduced to the motor control as indicated at 102 reverses the drive of the motor and feeds a signal to the time delay 100, which after a time delay emits a timer signal as indicated at 103 and actuates the pinch roll actuator 84 through a normally closed switch 104. Thus, after the delay set by the time delay 100, the tape is engaged with the reversely-rotating drive capstan 78 to drive the tape in reverse direction. An arrest signal fed at 101 arrests the tape at the end of its reverse travel. A roll signal introduced at 105 may then again reverse the drive motor 80 to drive the drive capstan 78 forwardly. The roll signal also is fed to the time delay which, after the set period, feeds a timer signal as indicated at 103 and also feeds a signal to the pinch roll actuator 84 if the switch 104 is closed. As explained hereinafter in connection with the operation of the apparatus, the switch 104 is maintained open until all of the tape decks are in condition for forward tape drive. At that time, the switch 104 returns to its closed position and all of the tapes on the respective tape decks are then advanced simultaneously.

Thus, the mechanism diagramed in FIG. 2 operates effectively to disengage the tape from the drive during the period of changing motor operation and assures engagement of the tape with the drive only after the time delay period provided by the delay mechanism 100. It also enables co-ordination of the several tape or web drive means to operate in precise synchronism.

Figure 3:
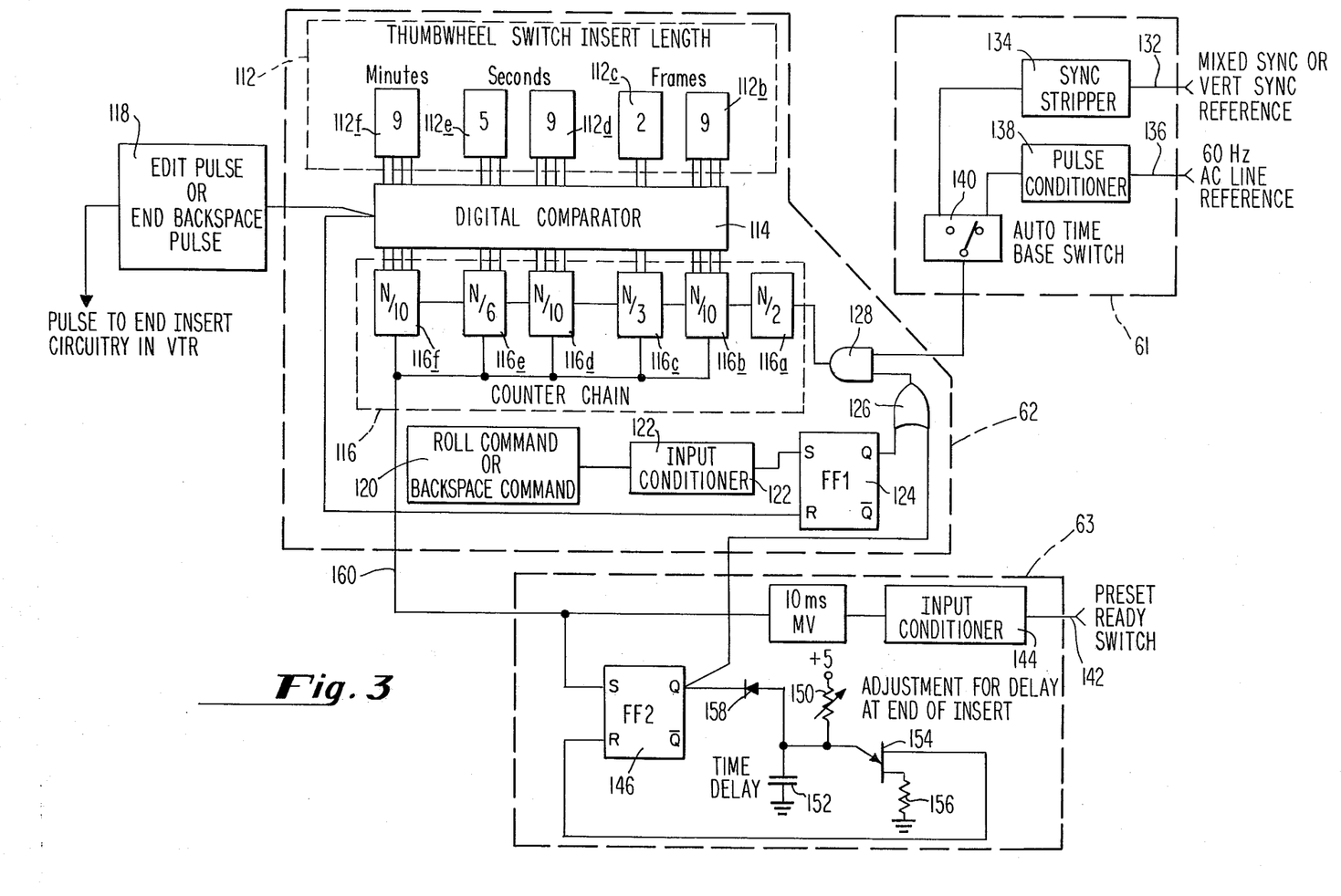
FIG. 3 is a schematic illustration of timing means embodied in the system of FIG. 1.

FIG. 3 illustrates the rollback timer 15 for timing out the desired periods of movement, including the common timing pulse source 61, or clock. The animation time-delay circuitry 63 is a feature employed on the edit deck 10 of FIG. 1 only. The post-edit timer 64 is similar to the pre-edit timer 62 and both are like the rollback timer 15 without the animation feature. The desired pre-edit or post-edit time period is manually set and the rollback time may be obtained from these or independently set. Each of the rollback timers 15, 35 and 45 is a dual-mode timer similar to the timer 62, and in accordance with the invention, is set in one mode for a period precisely equal to the time period of the pre-edit time period and in the other mode for a time period precisely equal to the sum of the pre-edit and post-edit time periods.

It will be observed that forward roll as well as rollback labels have been employed on FIG. 3. A conventional edit type circuit will be described first, then the additional circuitry to perform the animation function will be described.

The time period prior to edit is pre-set by use of a manual selection panel 112, which employs numbered thumb wheels 112b through 112f, calibrated so that 112b sets the units and 112c sets the tens of frames; 112d sets the units and 112e sets the tens of the number of seconds; 112f sets the number of minutes up to 10. Since individual frames occur every thirtieth second in American standard video tape, this will be taken as the basis for the example of a present discussion. However, it will be understood that where other standards are employed, as in European television systems, or otherwise, the system can be modified and the technique and system of the invention is still applicable. Since there are 30 frames to a second, a number of frames may be selected up to maximum of 29, the number actually illustrated in this case. Seconds can be selected up to a maximum of 59, and minutes are limited only by the provision of a units digit in this embodiment. The selection wheels have their position transmitted to a digital comparator 114, which, in turn, translates their analog position, representative of the digital number, into a binary code for setting a corresponding counter 116b through 116f. There is an additional counter 116a in the counter chain 116, which will take a 60 cycle clock signal and divide it by two so that pulses are output to gate 116b every one-thirtieth second, or the rate of frames on the video tape. Gate 116b outputs to gate 116c a pulse every 10 pulses it receives. Gate 116c outputs to gate 116d a pulse every 3 pulses it receives. Gate 116d outputs to gate 116e a pulse every 10 pulses it receives. Gate 116e outputs to gate 116f a pulse every 6 pulses it receives. Because of the presetting of the number by the thumb wheels, when a digital comparator receives a corresponding count on the counter chain 116, it will emit a 500 millisecond pulse at 118 to the coordination means 65 (see FIG. 1), to institute either the edit or the preview function, as selected by the selector 67.

The counter will not count initially until AND gate 128 is conditioned to pass timing pulses by command unit 120 of either roll command or back space command depending on the application of the particular timer assuming a roll command the pulse is initiated by "Roll" button 12c (in the manual controls 12) through the means 65, as conditioned by the "edit preview" selector 67 and the source selected by the selector 66. An input conditioner 122 conditions and transmits the pulse to the set terminal of flip-flop 124, placing a signal through OR gate 126 on one of the two input terminals of AND gate 128, conditioning that gate to allow pulses from the time source 61 at the other terminal to pass through the gate. The time source 61 may be provided with an automatic time base switch 132, which selects either a mixed sync or vertical sync reference from a television signal and puts it through a sync stripper 134 or alternatively, as determined by a selector 140, selects a 60 Hertz a.c. line reference at 136 put through a pulse conditional 138 so that it outputs pulses of proper shape to actuate the counter. Either way, in accordance with the standard American system, pulses will be input to the counter 116 at 60 pulses per second while permitted by flip-flop output 124 to pass "AND" gate 128 and the operation of the counter will be as described. After the selected count has been reached, counter pulse output is fed back to reset flip-flop 124 to cut off the enabling signal on AND gate 128 so that pulses can no longer pass through AND gate 128.

The edit mode, forward roll operation employs the timer 62 to output an edit pulse when the selected pre-edit time period has elapsed after the roll button 12c is pressed and the tapes are engaged with their drive. This pulse is the signal causing switch over from one deck to another. The timer 64 operates in the same fashion to output an "end backspace" pulse when the rollback period has been counted out. The rollback timers 15, 35, and 45 operate to output an end backspace pulse to stop the tapes a predetermined time before the edit point. The rollback time will equal the sum of the pre-edit and post-edit times when preview is employed or just pre-edit if rollback occurs from the edit point, and selections of timer times are dependent upon operational mode. Thus, for example, a rollback counter may operate to output end-backspace pulse in the second mode when the cumulative post-edit and pre-edit time periods have elapsed after the tapes are engaged with their drives.

EDIT MODE

The present invention provides a system in which the editor scans the information on the edit tape and presses the "edit stop" button to establish the edit stop point on the edit tape. In like fashion, the editor scans the information on the transfer tape and presses the "edit start" button on the transfer tape deck to select the edit start point on the source tape. In each case this operation also initiates a rollback cycle. At the end of the rollback cycles, the Roll button on the edit deck causes the drives to the respective tapes to be reversed while the tapes are at rest and then after the drives are at full speed forward the tapes are simultaneously driven in the forward direction. When the edit points are reached, the edit deck initiates recording from the transfer tape at the edit point to thereby terminate any previous recording on the edit tape beyond the edit point. In this way the system automatically and accurately initiates recording on the edit tape from the edit start point established on the transfer source tape at the edit stop point previously established on the edit tape. Thus, the present invention does not depend on manual and visual skills but enables proper editing and the preparation of a satisfactory edit tape by an editor whose manual dexterity may be limited. All that is necessary in steps prior to actual editing, is for the editor to press an edit stop button when the monitor displays an edit point he wishes to select on the edit tape and similarly, during separate viewing and at a different time, for him to press the edit start button when the monitor displays an edit start point on the transfer tape he wishes to select. After this manipulation, subsequent operation of the Roll button automatically performs the desired edit function.

In the operation of the system shown in FIG. 1, when the edit tape deck 10 is receiving information from the transfer deck 22 in the edit mode, the edit deck and the transfer deck from which the information is being recorded are operated continuously until the proposed edit point is passed. The manual stop 12a is pushed to arrest the recording. The desired information source is selected by the deck selector 66 and the system is placed in the edit mode by the switch 67. The tape on the edit tape deck 10 is then scanned by control 12e and playout on the monitor 13 to locate the edit point and the edit tape is stopped at this point by the edit stop selection.

The "edit point" selection is made by pressing the edit stop button 12d which, through controls 16, outputs an arrest signal to the "tape drive means" of the edit deck and disengages the tape from the tape drive (capstan and pinch roll) and puts out a timer signal at 103 which, through the controls 16, generates a rollback signal which is applied to the motor control at 82 (FIG. 2). When the motor is reversed, the time delay output signal at 103 triggers the rollback timer 15 (FIG. 1) simultaneously with the engagement of the pinch roll actuator 84 to roll back the edit tape for the period set on the rollback timer 15 to a pre-edit start point, for example, exactly 8 seconds. At the end of this period, the timer 15 feeds a pulse to arrest the tape which disengages the tape from driven engagement with the rolls.

If the deck selected at 66 is a data web deck, such as magnetic or paper tape or film, as 22 in FIG. 1, that deck is energized, the web is scanned on the monitor 33 by the scan control 32b and the deck is stopped at the edit start point by the "backspace" button 32a. The deck 22 operates like the edit tape deck 10 to roll back its tape to a pre-edit start point, the same exact 8 second period before the edit point. In this fashion both the edit deck and the data web deck are stopped at the pre-edit start point.

The roll button 12c is then depressed which, as before, causes the drive motors of the edit deck and the data web deck to drive the drive rolls forward. The "coordination means" 65 (FIG. 1) includes a gate arrangement to open the switches 24 and 10 (104 in FIG. 2) and delay tape movement until both drive motors are up to speed after a predetermined time delay. The timer pulses from 100 permit closure of both switches 104 and the respective actuators 84 engage the respective tapes with the drive rolls to drive the tape forward. Simultaneous with the engagement of the tapes with the drive rolls, the pre-edit timer 62 is actuated to maintain the drive of the tapes for precisely the same amount of time, in this case 8 seconds, and thus for substantially identical distances from the pre-edit points to the previously selected edit points.

In the edit mode, the pre-edit timer 62 puts out an edit pulse at 118 which, through the controls 16, initiates recording of the information from the transfer tape onto the edit tape at precisely the edit points, erasing any information on the edit tape previously recorded past the edit point. The system then continues to transfer information from the transfer tape to the edit tape in the conventional manner.

When the edit tape is receiving signals from the camera source 26 (FIG. 1), the selection of the edit start point is omitted since the scene being recorded by the camera may be started when the edit signal from the pre-edit timer 62 energizes the live-camera signal through the coordination means, 65, and the controls, 56. After the live segment is recorded on the edit tape, the recording function of the system may be stopped and the tape completed with additional information from another source by the editing procedure discussed above.

PREVIEW MODE

In the preview mode, it is possible to operate the system so as to preview on the monitor the information which will be transferred to the edit tape on the edit deck in order to insure prior to transfer that the information will be transferred in the proper sequence. To this end, the preview mode enables the signals to be previewed on the monitor of the system without actually transferring the signals to the edit tape on the edit deck, and at the same time preserves the edit points which have been selected. In this fashion, the preview mode of the system permits the edit points to be verified prior to actually transferring the data from the transfer decks to the edit deck.

In operation, the preview mode is selected by the selector 67 (FIG. 1). The system is operated as described above in connection with the selection of the respective edit points, and the roll back of the tapes to the pre-edit points according to the time period selected by the first mode of the rollback timers in the previously described embodiment, (precisely 8 seconds). The edit tape and the selected transfer tape are therefore at rest at their pre-edit points.

In the preview mode, depressing the Roll button 12c causes engagement of the drives with the drive rolls and after a predetermined delay to permit the rolls to attain speed engages the two tapes with respective rolls as described above. Simultaneously, the pre-edit timer 62 is actuated to count forward the precise time to the edit point. When the pre-edit timer reaches the count, it emits the edit pulse. In this case, the pulse operates to display the proposed edit on the monitor without actually performing the transfer to the edit tape. In the preview mode, the edit pulse from the timer 62 through the coordination means 65 and the controls 16 causes the input 17 to be displayed on the monitor 13. The pulse also initiates the post-edit timer 64 for the predetermined preset period, for example exactly 4 seconds. At the end of the post-edit period, the output pulse from the timer 64, through the coordination means 65 provides an arrest signal to the two decks, stopping the rolls and disengaging the tapes therefrom at a post-edit oint. When the tapes are disengaged, the timer output pulses through the coordination means 65 then cause engagement of the rolls in the reverse direction and after the predetermined delay period, engagement of the tapes with the reverse-driven rolls to return both the edit tape and the transfer tape to their pre-edit points under the control of their rollback timers which operate in their second mode, which cumulates the pre-edit and post-edit time periods, in this case 12 seconds.

If the preview is satisfactory, the edit mode may then be actuated by simple operation of the edit selector switch 67 and the actuation of the roll button 12c to advance both tapes past the edit point, the tape deck recording the information from the transfer deck upon the edit tape when the edit point is reached, as set forth above.

If the preview is not satisfactory and it is not desired to perform the edit start or edit stop point may be selected by scanning the tapes, and the preview mode is repeated as outlined above until a satisfactory edit is previewed, and the edit mode is actuated.

ANIMATION MODE

The present system lends itself to animation in which a limited number of frames is transferred to the edit tape. The limited number of frames represents one segment of the desired animation. In the animate mode, the edit point is selected in the normal fashion but instead of initiating a transfer from the second source at the edit point and allowing the transfer to continue, the edit function is modified so as to transfer only the first segment (a selected number of frames beyond the first edit point) onto the edit tape. At the conclusion of the segment, the system automatically selects a frest edit point at the end of the first segment as determined by the setting of the time delay circuit embodied in the system. With the selection of the fresh edit point, the system may continue in the animate mode in order to record the next segment. If the animation continues, the system automatically selects a further edit point at the end of the next segment which is the same selected number of frames beyond the previously selected edit point.

Typically the animated segments are taken from a source such as the live camera 26 in FIG. 1 which translates still pictures into magnetic signals suitable for recording on magnetic tape. In the animate mode, the particular start point is not critical since the motion is absent. In animating, each segment comprises one frame or a selected number of frames of the secne viewed by the camera 26. Upon completion of the recording the segment, the operation is stopped and the scene is changed. The animate mode of the system eliminates the need for re-selecting the edit points and the animate function may progress with the new scene. This may continue until the animated sequence is completed, at which time the conventional edit mode is reinstated.

During operation of the animate mode, the source selector 66 is adjusted to select the camera source III, 26, whose output 57 is a directly recordable video signal. In addition, the normal/animate selector 68 is positioned in the animate position. When animating, since the subject of the television camera is stationary, there is no requirement for selecting the edit start point in the camera source. Accordingly, the operations preliminary to the animation consist only of establishing the edit stop point on the edit tape as described above. When this is completed, the edit tape is at its pre-edit stop position. The animate selector 68 through the coordination means 65 actuates the time delay circuit 63 with the pre-edit timer 62 so that the timer feeds its edit signal to the deck 10 with a time delay equivalent to a single frame, or a selected sequence of frames, as determined by the setting of the time delay circuit 63. For the purpose of this description the time delay is assumed to be equivalent to a single frame, representing one segment of the animation.

In the operation of the animate mode, with the source 26 functional and generating a signal, the roll button 12c is pressed to initiate operation of the edit tape deck and advance of the tape as described above. The pre-edit timer 62 functions in conjunction with the time delay to permit the tape on the edit deck to advance the normal pe-set period (in the instance 8 seconds) plus a single frame prior to the signal initiating the edit transfer of intelligence from the output 57 to the tape on the deck 10. In the animate mode, the post-edit timer 64 is rendered operative in conjunction with the edit transfer functions so that the post-edit timer 64 is triggered concurrently with the editing at the end of the pre-set period plus one frame. The post-edit timer 64 then permits continuation of the advance of the tape on the tape deck, recording the information from the camera source 26 for the post-edit period, for example 4 seconds. At the completion of the 4-second interval called for by the post-edit timer, the timer puts out a terminal signal as in the preview mode which rolls back the edit tape deck for the combined time period of the pre-edit timer and the post-edit timer (without the one frame delay), e.g. 2 seconds. The tape is thereby rolled back to a fresh pre-edit point which is one frame later than the previous pre-edit point.

At this point the scene viewed by the camera 26 is altered and the roll button is pressed to repeat the operation just described. Repeating the operation, including the one frame delay, causes the edit deck to record the fresh scene viewed by the camera 26 as the next segment on the edited tape exactly one frame subsequent to the previous edit point. At the completion of the post-edit time period, the system automatically reverts to a frest pre-edit stop point, again one frame subsequent to the last pre-edit stop point.

This procedure is then repeated until all of the segments desired have been recorded in sequence on the edited tape and the deck is returned to its final pre-edit stop point. The selector 68 is then returned to the normal position. A source for additional information following the animation is selected by the selector 66. The newly selected source is scanned to locate the fresh edit start point in that source, as described above, and when located the edit start button is pressed to roll back the source tape to the proper pre-edit start point. Whereupon the roll button 12c may be pressed to initiate the edit which will then continue until it is stopped by the manual stop or a timed counter stop.

As explained above animation is the result in a delay of the edit point by a single or multiple frame in successive frames. The delay is produced by a timer which somehow imposes the required delay upon the system. The nature of the timer may vary from a mechanical timer to the electronic timer 63 of FIG. 3 or any other type adapted to this use. In the FIG. 3 embodiment the timer circuit 63 is employed with the counter 62 used with the backspace or rollback function. Anytime after a count has been completed producing an end backspace pulse 118 also used to reset and turn off flip-flop 124, the counter 32 may be preconditioned to count less in the next actual backspace operation. This is done through preset ready switch 142 to input conditioner which sets flip-flop 146 at the same time it resets the counter chain 116. Setting flip-flop 146 applies a steadyrelatively high positive potential through OR gate 126 to the terminal of AND gate 128 allowing pulses to pass and start counting. At the same time diode 158 is back biased to permit flow of current through variable resistor 150. Changing resistance of resistor 150 causes a change in the delay period and the adjustment may be calibrated in terms of time delay or frame delay sought. The current flow causes capacitor 152 to charge until unijunction transistor 154 conducts connecting reset terminal of flip-flop 146 to ground through resistor 156, thereby terminating the positive potential at terminal Q and cutting off timer pulses from timer 61 through AND gate 128. Thus counter 116 has already a count toward the count at which the end backspace pulse is emitted. When the backsace command 20 is given thereafter to set flip-flop 124 and open AND gate 128 for clock pulses again, the end backspace pulse will occur before rollback has caused the magnetic tape to reach the former pre-edit point by the amount selected by the timer.

The animation timer in addition to being of another type, may be located differently to act somewhat differently on the backspace counter. In the system described where there are rollback timers on each deck nd common counters for other purposes, it may be more convenient to associate the counter with the rollback function. However, in another system instead of subtracting from the rollback time, it might add to the pre-edit time, advancing the magnetic tape from its old to its new pre-edit point before editing occurs.

INTERLOCKING CONTROLS

The system preferably includes interlocking controls which prevent operation of the edit function if any of the preliminary steps is omitted, or if there is a malfunction in the system. Furhermore, in order to provide a proper edit, it is necessary to have the horizontal sync signals of the edit tape exactly in correlation with he horizontal sync signals of the output from the new source when that output is recorded on the edit tape.

To insure coincidence in the frames of the two sources during th edit mode, the input 17 of the edit tape deck includes a sync stripper for the incoming signal which, through the electronic controls 16, is compared with the sync signal of the edited tape. If the signals are in coincidence, for example as sensed by an AND gate in the coordinator 65, the corrdinator maintains the edit mode of the system operative. If the signals are out of coincidence, however, the coordinator 65 may render the edit function of the system inoperative by electronically switching the Edit/Preview selector 67 to the preview mode which causes the edit deck to preview and return to the pre-edit stop point. The rollbutton 12c may then be pressed again, this manipulation having modified the phasing of the signals between the two decks to provide an opportunity for the horizontal sync signals to coincide and thereby render the edit mode functional.

The coincidence of the frames is facilitated by te system arrangement in which all of the timers are actuated by the timing signals from the same time source 61. Thus, not only does this arrangement insure identical timing by the respective timers in the system, but it also insures that the timers are initiated simultaneously, and their terminal signals are, therefore, emitted at precisely identical times. The interlocking controls may also provide a warning signal in the event the timer dials are not set for the same pre-edit or post-edit time periods.

We claim:

1. A method of performing an editing function upon intelligence recorded on a magnetic tape being edited on an edit tape deck employing drive means which engages the tape to drive it and releases the tape to stop it in order to insert upon that magnetic tape after a selected edit point similarly recordable other intelligence from another data web bearing that other intelligence on a transfer tape deck employing drive means which engages the data web to drive it and releases the data web to stop it, comprising monitoring the magnetic tape being edited as it moves on the edit tape deck to select an edit point, stopping said magnetic tape at the selected edit point, monitoring said other data web bearing other intelligence as it moves on the transfer tape deck to select an edit point from which to begin recording,
stopping said other data web at said selected edit point,
bringing the respective drive means up to constant reverse speed before engaging the magnetic tape and the data web,
engaging and driving, simultaneously or sequentially, the magnetic tape being edited and the other data web, respectively, at almost instantaneously constant speeds in reverse back from their edit points to pre-edit stop points and timing the time taken for each between said points,
stopping the respective magnetic tape and data web precisely at their respective pre-edit stop points,
bringing in the respective drive means up to constant forward speed before engaging the magnetic tape and the data web,
engaging and driving said tape and said web forward from their respective pre-edit stop points beginning at such relative times and at such almost instantaneously constant relative speeds that they will reach their edit point at precisely the same time, and
effecting transfer at said edit point on an edit monitor from the intelligence recorded on the magnetic tape being edited to the intelligence on the data web in order to see the precise effect of a proposed edit at said edit point.

2. A method of performing an editing function upon intelligence recorded on a magnetic tape being edited on an edit tape deck employing drive means which engages the tape to drive it and releases the tape to stop it in order to insert upon te magnetic tape after a selected edit point similarly recordable other intelligence from another data web bearing that other intelligence on a transfer tape deck employing drive means which engages the data web to drive it and releases the data web to stop it, comprising
monitoring the magnetic tape being edited as it moves on the edit tape deck to select an edit point,
stopping said magnetic tape at the selected edit point,
monitoring said other data web bearing other intelligence as it moves on the transfer tape deck to select an edit point from which to begin recording,
stopping said other data web at said selected edit point,
bringing the respective drive means up to constant reverse speed before engaging the magnetic tape and the data web,
engaging and driving, simultaneously or sequentially the magnetic tape being edited and the other data web, respectively, at almost instantaneously constant speeds in reverse back from their edit points to pre-edit stop points and timing the time taken for each between said points,
stopping the respective magnetic tape and data web precisely at their respective pre-edit stop points,
bringing in the respective drive means up to constant forward speed before engaging the magnetic tape and the data web,
engaging and driving said tape and said web forward from their respective pre-edit stop points beginning at such relative times and at such almost instantaneously constant relative speeds that they will reach their edit point precisely the same time, an
effecting a transfer at said edit point of the intelligence recorded on the data web to the magnetic tape being edited.

3. A method of performing an editing function upon intelligence recorded on a magnetic tape being edited on an edit tape deck employing drive means which engages the tape to drive it and releases the tape to stop it in order to insert upon that magnetic tape after a selected edit point similarly recordable other intelligence from another data web bearing that other intelligence on a transfer tape deck employing drive means which engages the data web to drive it and releases the data web to stop it, comprising
monitoring the magnetic tape being edited as it moves on the edit tape deck to select an edit point,
stopping said magnetic at the selected edit point,
monitoring said other data web bearing other intellignece as it moves on the transfer tape deck to select an edit point from which to begin recordings,
stopping said other data web at said selected edit point,
bringing the respective drive means up to constant reverse speed before engaging the magnetic tape and the data web,
engaging and driving, simultaneously or sequentially, the magnetic tape being edited and the other data web, respectively, at almost instantaneously constant speeds in reverse back from their edit points to selected pre-edit stop points, the points being selected such that when the magnetic tape and data web are driven forward at almost instantaneously constant operating speeds starting at the same time each will reach its respective edit point at the same time,
stopping the respective magnetic tape and data web precisely at their respective pre-edit stop points,
bringing in the respective drive means up to constant forward speed before engaging the magnetic tape and the data web,
engaging and simultaneously driving said tape and said web forward from said pre-edit stop points at almost instantaneously constant operating speeds, and
effecting a transfer at said edit point of the intelligence recorded on the data web to the magnetic tape being edited.

4. The method of claim 3 in which the said tape and said web are driven in reverse from the edit point back to pre-edit stop points at the same speeds they travel forward in operation, timing said reversal and then driving said tape and said web forward at operating speed for the same time at which point said transfer of the intelligence recorded on the data web to the magnetic tape is effected.

5. A method of performing an editing function upon intelligence recorded on a magnetic tape being edited on an edit tape deck employing drive means which engages the tape to drive it and releases the tape to stop it in order to insert upon that magnetic tape after a selected edit point similarly recordable other intelligence from another data web bearing that other intelligence on a transfer tape deck employing drive means which engages the data web to drive it and releases the data web to stop it, comprising
monitoring the magnetic tape being edited as it moves on the edit tape deck to select an edit point,
stopping said magnetic tape at the selected edit point, monitoring said other data web bearing other intellience as it move on the transfer tape deck to select an edit point from which to begin recording, stopping said other data web at said selected edit point, bringing the respective drive means up to constant reverse speed before engaging the magnetic tape and the data web, engaging and driving, simultaneously or sequentially, the magnetic tape being edited and the other data web, respectively, at almost instanteously constant speeds in reverse back from their edit points to selected pre-edit stop points, the points being selected such that when the magnetic tape and data web are driven forward at almost instantaneously constant operating speeds starting at the same time each will reach its respectiv edit point at the same time, stopping the respective magnetic tape and data web precisely at their respective pre-edit stop points, bringing in the respective drive means up to constant forward speed before engaging the magnetic tape and the data web, engaging and simultaneously driving said tape and said web forward from said pre-edit stop points at almost instantaneously constant operating speeds, and effecting transfer at said edit point on an edit monitor from the intelligence recorded on the magnetic tape being edited to the intelligence on the data web in order to see the precise effect of a proposed edit at said edit point.

6. The method of claim 5 in which the said tape and said web are driven in reverse from the edit point back to pre-edit stop points at the same speeds they travel forward in operation, timing said reversal and then driving said tape and said web forward at operating speed for the same time at which point said transfer on the edit monitor is accomplished.

7. The method of claim 6 in which said tape and said web are stopped simultaneously at post-edit points, the elapsed time being counted between edit and post-edit points, said tape and said web are then reversed at their forward operating speeds for a time equal to the sum of time elapsed between pre-edit and edit points and between edit and post edit points and stopped at the pre-edit points, and said tape and said web are then driven forward at operating speed for the same time previously taken to drive them to the edit point, at which point transfer of intelligence on the data web to the magnetic tape being edited is accomplished.

8. The method of claim 7 in which the sequence is repeated except that the pre-edit is shifted toward the prior edit point by predetermined distance in the reversing sequence by shortening the time of rollback of the magnetic tape being edited so that on the next forward roll the same timing for the edit point will advance the edit point by a corresponding amount and different material may be introduced at each new edit point from different data webs or different places in the same data web.

9. The method of claim 7 in which the sequence is repeated except that the edit point is shifted away from the pre-edit point by addition of predetermined amount of time before edit occurs on the web being edited and then rolling said web back the same amount followed agin by the same edit point advance on forward roll and different material may be introduced at each new edit point from different data webs or different places on the same data web.

10. A magnetic tape editing system having at least an edit deck and another deck each having motor means capable of driving tapes or webs on said decks in reverse at the same constant speed as forward speed for use of intelligence, on said respective tape or web, and means whereby a magnetic tape on the deck may be edited or modified by a data web on the other deck, including monitor means for monitoring intelligence on said magnetic tape and on said data web, motor controls for said respective motor means for selectively energizing the respective deck motors in the forward or reverse direction, drive means driven by the respective motor means for engaging and driving the respective tape and web, and actuators for the drive means whereby the respective tape and web may be immediately engaged and almost instantaneously driven at motor speed in either direction and immediately disengaged and almost instantly stopped, presettable timer means, means causing said presettable timer means to time the periods during which the respective tape and web are engaged beginning with engagement and ending with disengagement of the drive means, and means causing the actuator to respond to the respective timer means to stop said drive means, means to transfer monitoring from the intelligence on the magnetic tape to that on the data web, and means to transfer the intelligence at that point and thereafter from the data web to the magnetic tape.

11. The magnetic tape editing system of claim 10 in which time delay means are provided allowing the motors to reach full speed before the drive means are engged.

12. The system of claim 10 in which the editing system is for video tape and the edit deck is therefore a video tape deck and the other deck is for a data web bearing intelligence transferable to video tape including means to effect the transfer from the data web on the other deck to the video tape on the edit deck.

13. The system of claim 10 in which the respective timers are electronic pulse counters with means to set the counters to provide an operating output at preselected counts and suitable pulse source means to provide clock puses for counting.

14. The system of claim 13 in which a plurality of data web decks is employed and in which at least one of the data web decks is a video tape deck.

15. The system of claim 13 in which count length selection means is provided having manually positionable means enabling selection of length of the particular run counted by the counter to be set in terms of frames, seconds and minutes.

16. The system of claim 15 in which multiple counter means are provided for each deck of the system.

17. The system of claim 15 in which counter means is provided on each deck for timing the distance travelled between a pre-edit point and a selected edit point and between said edit point and a selected post-edit point.

18. The system of claim 17 including an animate feature comprising an animation timer for the edit deck whereby the selected length of vidio tape advanced in each animation step is determined by the animation timer.

19. The system of claim 17 in which separate rollback counter means is provided on each deck for timing the rollback distance travelled between either the edit and the pre-edit points or between the post-edit and pre-edit points.

20. The system of claim 19 in which an animation timer is employed in conjunction with the rollback counter means on the edit deck whereby in animation mode the animation timer is connectable to the rollback counter prior to rollback to cause the rollback counter to count down a count equivalent to a selected animation step whereby a new pre-edit position is selected in response to the diminished count of the rollback counter advanced the distance of the elected animation step from the previous pre-edit point.

21. A magnetic tape editing system having at least an edit deck and another intelligence source, said edit deck having motor means capable of driving tape on said deck in reverse at the same almost instantaneously constant speed as forward speed for use of intelligence on said tape, and means whereby a magnetic tape on the deck may be edited or modified by intelligence from the other source, monitor means for monitoring intelligence on said magnetic tape and from said other source, motor controls for selectively energizing the deck motor means in the forward or reverse direction, drive means driven by the motor means for eangaging and driving the tape, and an actuator for the drive means whereby the respective tape and web may be immediately engaged and driven almost instantaneously at motor speed and direction and immediately stopped by disengagement, presettable timer means, means causing said presettable timer means to time the periods during which the drive means is engged beginning with engagement of the drive means, animation timer means to change the time period in which the drive means is engaged in one direction by an amount corresponding to a selected length of magnetic tape corresponding to the length needed to record intelligence from said other source to correspondingly defer the edit point on the magnetic tape, and means responsive to the timer means including means to stop said drive means, to trnsfer monitoring from the magnetic tape to the intelligence on the other deck, means to transfer the intelligence at sequentially selected edit points from intelligence sequentially presented on the other deck to the magnetic tape on said edit deck, and means to activate said animation timer means to modify the edit point.

22. A method of performing and editing function upon intelligence recorded in successive data frames on a magnetic tape being edited on an edit tape deck employing drive means which engages the tape to drive it and releases the tape to stop it in order to insert upon that magnetic tape after a selected edit point an integral number of data frames of similarly recordable other intelligence from another source having that other intelligence on a transfer tape deck employing drive means which engages the data web to drive it and releases the data web to stop it, comprising monitoring the magnetic tape being edited as it moves on the edit tape deck to select an edit point, stopping said magnetic tape at the selected edit point, bringing the respective drive means up to constant reverse speed before engaging the magnetic tape and the data web, engaging and driving, simultaneously or sequentially, the magnetic tape being edited at almost instantaneously constant operating speed in reverse back for a first time period from its edit point to a selected pre-edit stop point, stopping the tape at said pre-edit stop point, engaging and driving said tape for said same time period forward from said pre-edit stop point at said constant operating speed, effecting a transfer at said edit point of the intelligence from the other source to the magnetic tape being edited.

stopping said tape at a post-edit point after a second time period counted between said edit and post-edit points, reversing said tape at its constant almost instantaneously forward operating speed for a time equal to the sum of first and second time periods less a time period corresponding to said integral number of data frames and stopping said tape at a second pre-edit point, driving said tape forward at almost instantaneously operating speed for the same first time period to thereby drive it past the edit point by said integral number of data frames to a second edit point, at which point further transfer of intelligence to the magnetic tape being edited is accomplished.

* * * * *

UNITED STATES PATENT OFFICE
CERTIFICATE OF CORRECTION

Patent No. 4,001,882          Dated January 4, 1977

Inventor(s) Anthony M. Fiori, Robert T. Fiori and Thomas C. Nicholas, III

It is certified that error appears in the above-identified patent and that said Letters Patent are hereby corrected as shown below:

Column 2, line 34, "times" should be --timed--;

Column 9, line 29, after "with" insert --their--;

Column 9, line 46, "oint" should be --point--;

Column 9, line 65, after "edit" (first occurrence), insert --, a new edit--;

Column 10, line 13, "frest" should be --fresh--;

Column 10, line 29, "secne" should be --scene--;

Column 10, line 64, "pe-set" should be --pre-set--;

Column 11, line 68, "backsace" should be --backspace--;

Column 12, line 10, "nd" should be --and--;

Column 12, line 23, "he" should be --the--;

Column 12, line 27, "th" should be --the--;

Column 12, line 32, "corrdinator" (second occurrence) should be --coordinator--;

Column 12, line 44, "te" should be --the--;

Claim 2, line 5, "te" should be --the--;

UNITED STATES PATENT OFFICE
CERTIFICATE OF CORRECTION

Patent No. 4,001,882            Dated January 4, 1977

Inventor(s) Anthony M. Fiori, Robert T. Fiori and Thomas C. Nicholas, III

It is certified that error appears in the above-identified patent and that said Letters Patent are hereby corrected as shown below:

Claim 2, line 37, "an" should be --and--;

Claim 3, lines 14-15, "intellignece" should be --intelligence--;

Claim 3, line 16, "recordings" should be --recording--;

Claim 5, lines 14-15, "intellience" should be --intelligence--;

Claim 5, line 15, "move" should be --moves--;

Claim 5, line 24, "instanteously" should be --instantaneously--;

Claim 5, line 30, "respectiv" should be --respective--;

Claim 11, line 4, "engged" should be --engaged--;

Claim 13, line 5, "puses" should be --pulses--;

Claim 21, line 12, "eangaging" should be --engaging--;

Claim 21, line 19, "enggéd" should be --engaged--;

Claim 21, line 28, "trnsfer" should be --transfer--; and

UNITED STATES PATENT OFFICE
CERTIFICATE OF CORRECTION

Patent No. 4,001,882   Dated January 4, 1977

Inventor(s) Anthony M. Fiori et al.

It is certified that error appears in the above-identified patent and that said Letters Patent are hereby corrected as shown below:

Claim 22, line 1, "and" should be -- an --.

Signed and Sealed this

Sixth Day of September 1977

[SEAL]

Attest:

RUTH C. MASON
Attesting Officer

LUTRELLE F. PARKER
Acting Commissioner of Patents and Trademarks